(12) United States Patent
Johnson

(10) Patent No.: US 6,442,179 B2
(45) Date of Patent: *Aug. 27, 2002

(54) DATA STORAGE COMMUNICATION CHANNEL AND METHOD OF TRANSMITTING DATA

(75) Inventor: Bruce E. Johnson, Minnetonka, MN (US)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/016,221

(22) Filed: Jan. 30, 1998

Related U.S. Application Data

(60) Provisional application No. 60/055,898, filed on Aug. 15, 1997.

(51) Int. Cl.⁷ .............................. H04J 1/00; H04J 3/04
(52) U.S. Cl. ...................... 370/535; 370/480; 370/536
(58) Field of Search ................................ 370/533, 534, 370/537, 538, 542, 540, 480, 481, 482, 543, 544, 532, 535, 536; 711/114

(56) References Cited

U.S. PATENT DOCUMENTS

| | | | | |
|---|---|---|---|---|
| RE31,295 E | * | 6/1983 | Haley et al. ................. | 370/481 |
| RE31,523 E | * | 2/1984 | Baker .......................... | 455/76 |
| 5,444,499 A | * | 8/1995 | Saitoh ......................... | 348/734 |
| 5,499,263 A | * | 3/1996 | Schmit et al. ............... | 370/537 |
| 5,594,492 A | * | 1/1997 | O'Callaghan et al. ........ | 348/10 |
| 5,617,425 A | | 4/1997 | Anderson .................... | 714/710 |
| 5,650,830 A | * | 7/1997 | Lee ............................. | 348/731 |
| 5,790,555 A | * | 8/1998 | Narahashi et al. .......... | 370/480 |
| 5,805,806 A | * | 9/1998 | McArthur .................... | 709/250 |
| 6,023,478 A | * | 2/2000 | Kilk et al. ................... | 370/535 |
| 6,040,867 A | * | 3/2000 | Bando et al. ................ | 348/423 |

OTHER PUBLICATIONS

Document entitled "Fibre Channel—Physical and Signaling Interface (FC–PH) Rev. 4.3", Jun. 1, 1994.

* cited by examiner

Primary Examiner—Ajit Patel
Assistant Examiner—Hanh Nguyen
(74) Attorney, Agent, or Firm—Kirk A. Cesari; Derek J. Berger; Shawn B. Dempster

(57) ABSTRACT

A data storage communication channel includes a transmission medium, an initiator interface and a frequency selective multiplexer. The initiator interface includes first and second serial transmit ports. The frequency selective multiplexer includes first and second modulators and a circulator. The first and second modulators have first and second frequency bands and are coupled to the first and second serial transmit ports, respectively. The circulator is coupled between the first and second modulators and one end of the transmission medium.

9 Claims, 5 Drawing Sheets

DATA STORAGE COMMUNICATION CHANNEL AND METHOD OF TRANSMITTING DATA

CROSS REFERENCE TO RELATED APPLICATION

This application claims the benefit of U.S. Provisional Application Serial No. 60/055,898, entitled "MULTIPLEXING DATA OVER COMMON TRANSMISSION MEDIA," filed Aug. 15, 1997.

BACKGROUND OF THE INVENTION

The present invention relates generally to data storage communication channels. More particularly, the present invention relates to a disc or tape drive communication channel in which data is frequency multiplexed over a common transmission medium.

A typical disc drive includes one or more discs, a transducer, a head-gimbal assembly supported above each disc, and a drive controller. The drive controller controls the disc drive to store information on and retrieve information from the disc based on commands received from a host system or disc drive initiator. Information is stored on a magnetic disc, for example, by providing a write signal to the transducer to encode flux reversals on the surface of the magnetic disc. The flux reversals represent the data to be stored. In retrieving data from a magnetic disc, the transducer senses the flux reversals and generates a read signal based on the flux reversals. The read signal is then decoded by the drive controller.

Data is typically transmitted between the disc drive and a host system or disc drive initiator over a communication channel, such as a serial Fiber Channel (FC) a Fiber Channel Arbitrated Loop (FC-AL) or a parallel Small Computer System Interface (SCSI) channel. The effective data transfer rate between the disc drive and the host system or disc drive initiator is therefore limited by the data transfer rate through the communication channel. Faster data rates have been achieved in communication channels by increasing the clocking rate and by changing the encoding/decoding scheme to one that is more efficient. However, these performance improvements are limited to the available transceiver and encoding technology. Other solutions which provide economical performance improvements with existing technology are desired.

Fast data transfer rates are particularly important in disc drive arrays. A disc drive array includes a plurality of disc drives which are coupled to an array controller through a communication channel. The array controller controls operation of the disc drive array so that, should one disc drive fail, the information stored on that disc drive can be recovered using information stored on the remaining disc drives in the disc drive array. Because the information stored in a disc drive array is often much more valuable than the disc drives themselves, disc drive arrays are often referred to as Redundant Arrays of Inexpensive Discs (RAID).

The present invention addresses these and other problems, and offers other advantages over the prior art, particularly for disc drive arrays.

SUMMARY OF THE INVENTION

The present invention relates to a data storage communication channel which increases the effective data transfer rate to a plurality of individual data storage devices over a transmission medium.

In accordance with one embodiment of the invention, the data storage communication channel includes a transmission medium, an initiator interface and a frequency selective multiplexer. The transmission medium includes a transmission path. The initiator interface includes first and second serial transmit ports for transmitting first and second serial transmit signals, respectively. The frequency selective multiplexer includes first and second modulators which are operatively coupled to the first and second serial transmit ports, respectively. The first and second modulators modulate the first and second serial transmit signals in first and second frequency bands, respectively, wherein the first frequency band is separate from the second frequency band. A circulator is operatively coupled between the first and second modulators and the transmission path. The circulator combines the first and second modulated serial transmit signals into a transmission signal and applies the transmission signal to the transmission path.

Another aspect of the present invention relates to a data storage communication channel including a transmission medium, a frequency selective demultiplexer and first and second data storage interfaces. The transmission medium includes a transmission path for carrying a transmission signal having first and second serial, digital transmit signals modulated in first and second frequency bands, respectively. The frequency selective demultiplexer includes first and second demodulators which are operatively coupled to the transmission path to receive the transmission signal. The first and second demodulators demodulate the first and second serial, digital transmit signals from the transmission signal in the first and second frequency bands, respectively. The first and second data storage interfaces are operatively coupled to the first and second demodulators, respectively, to receive the demodulated first and second serial transmit signals.

Another aspect of the present invention relates to a method of transmitting a plurality of data signals from a data storage initiator interface to a plurality of data storage interfaces which are operatively coupled to a data storage system backplane. The method includes the steps of: (a) frequency multiplexing the plurality of data signals together, wherein each of the plurality of data signals is modulated in a respective frequency band and wherein the respective frequency bands are separate from one another; (b) transmitting the frequency multiplexed plurality of data signals to the data storage system backplane through a serial transmission medium; (c) frequency demultiplexing the frequency multiplexed plurality of data signals received at the data storage system backplane, wherein each of the plurality of data signals is demodulated from the respective frequency band; and (d) applying each of the frequency demultiplexed plurality of data signals to a respective one of the plurality of data storage interfaces.

DETAILED DESCRIPTION OF THE PREFERRED EMBODIMENTS

Figure 1:
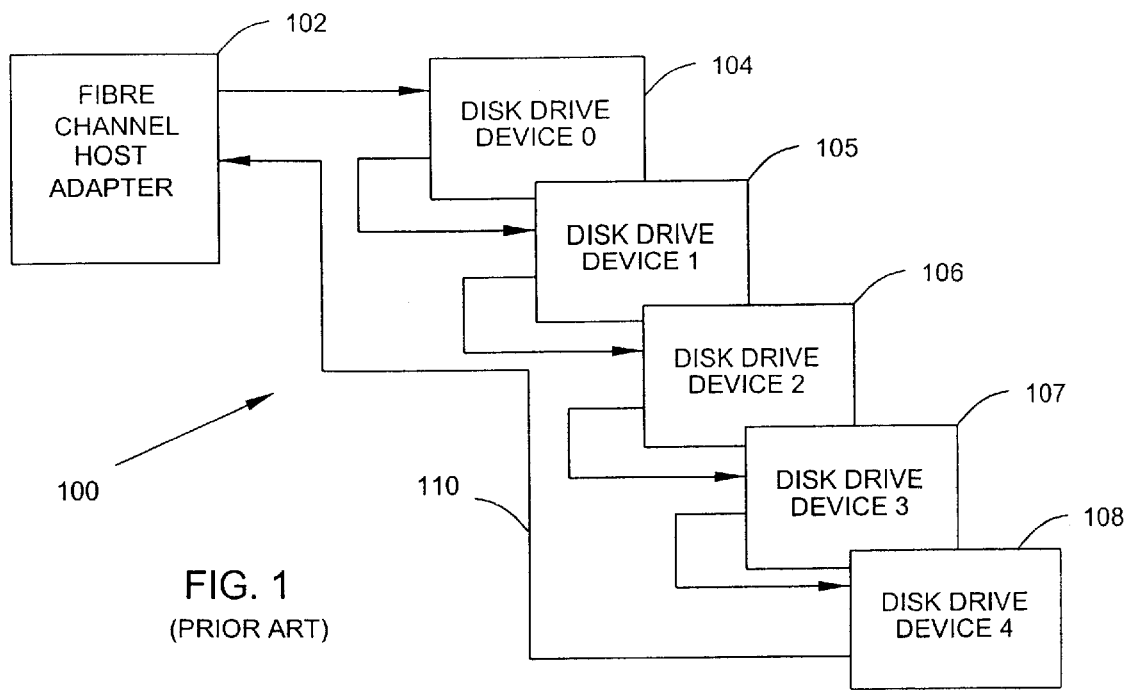
FIG. 1 is a block diagram of a disc drive system of the prior art having a Fiber Channel (FC) host adapter coupled in series with five disc drive devices.

FIG. 1 is a block diagram of a disc drive system 100 of the prior art having a Fiber Channel (FC) host adapter 102 which is coupled to five disc drive devices 104–108 over a Fiber Channel Arbitrated Loop (FC-AL) 110. FC host adapter 102 communicates serially to disc drive devices 104–108 by time multiplexing the data to each individual device over loop 110. Time multiplexing the data limits the effective data transfer rate to each disc drive device 104–108. For example, if FC host adapter 102 and disc drive devices 104–108 were equipped with transceivers capable of transferring serial data at 1 GHz, the effective data transfer rate to each disc drive device would be only about 200 Mhz. The communication protocol and physical construction of a Fiber Channel Arbitrated Loop are provided in ANSI FC-PH (Rev. 4.1).

Figure 2:
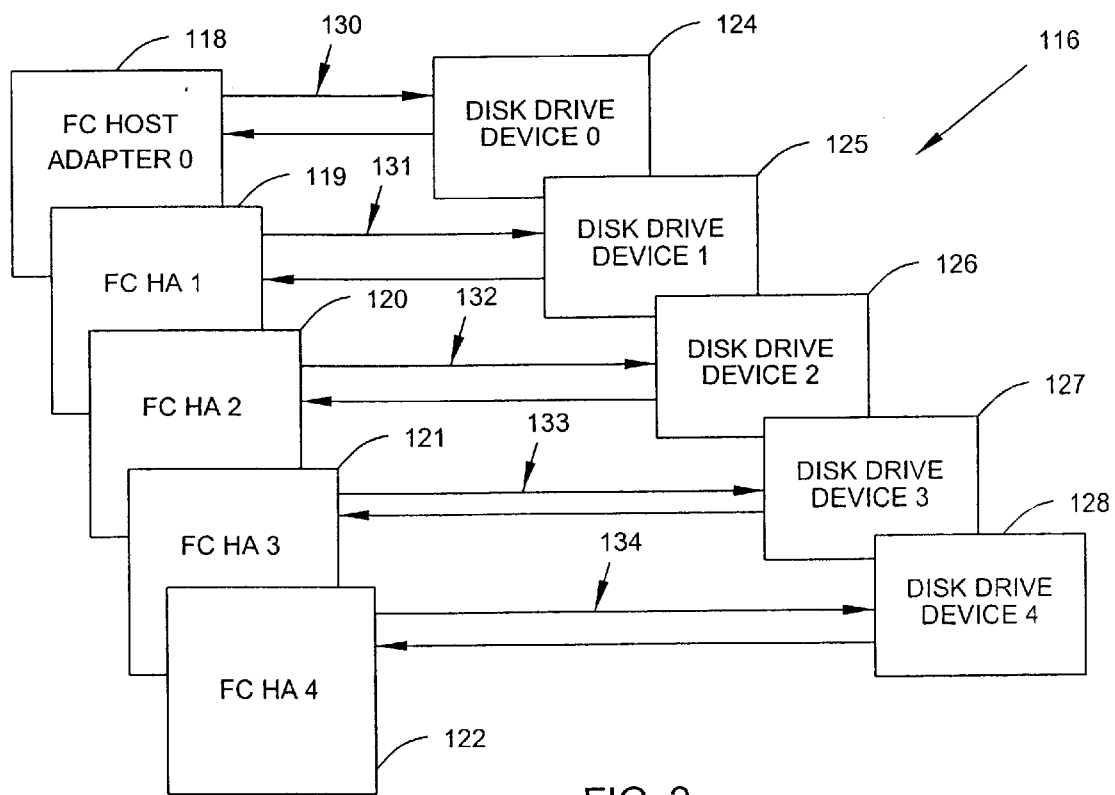
FIG. 2 is a block diagram of a disc drive system of the prior art having five FC host adapters coupled in parallel to five disc drive devices.

FIG. 2 is a block diagram of a disc drive system 116 of the prior art which has five individual FC host adapters 118–122 which are coupled in parallel to disc drive devices 124–128, respectively, by separate Fiber Channel (FC) cables 130–134. If FC host adapters 118–122 and disc drive devices 124–128 are equipped with 1 Ghz transceivers, disc drive system 116 allows a host system or disc drive initiator coupled to the FC host adapters to sustain a 5 Ghz throughput to disc drive devices 124–128. However, the use of multiple FC host adapters and fiber channel cables significantly increases the cost, complexity and space required by the disc drive system.

Figure 3:
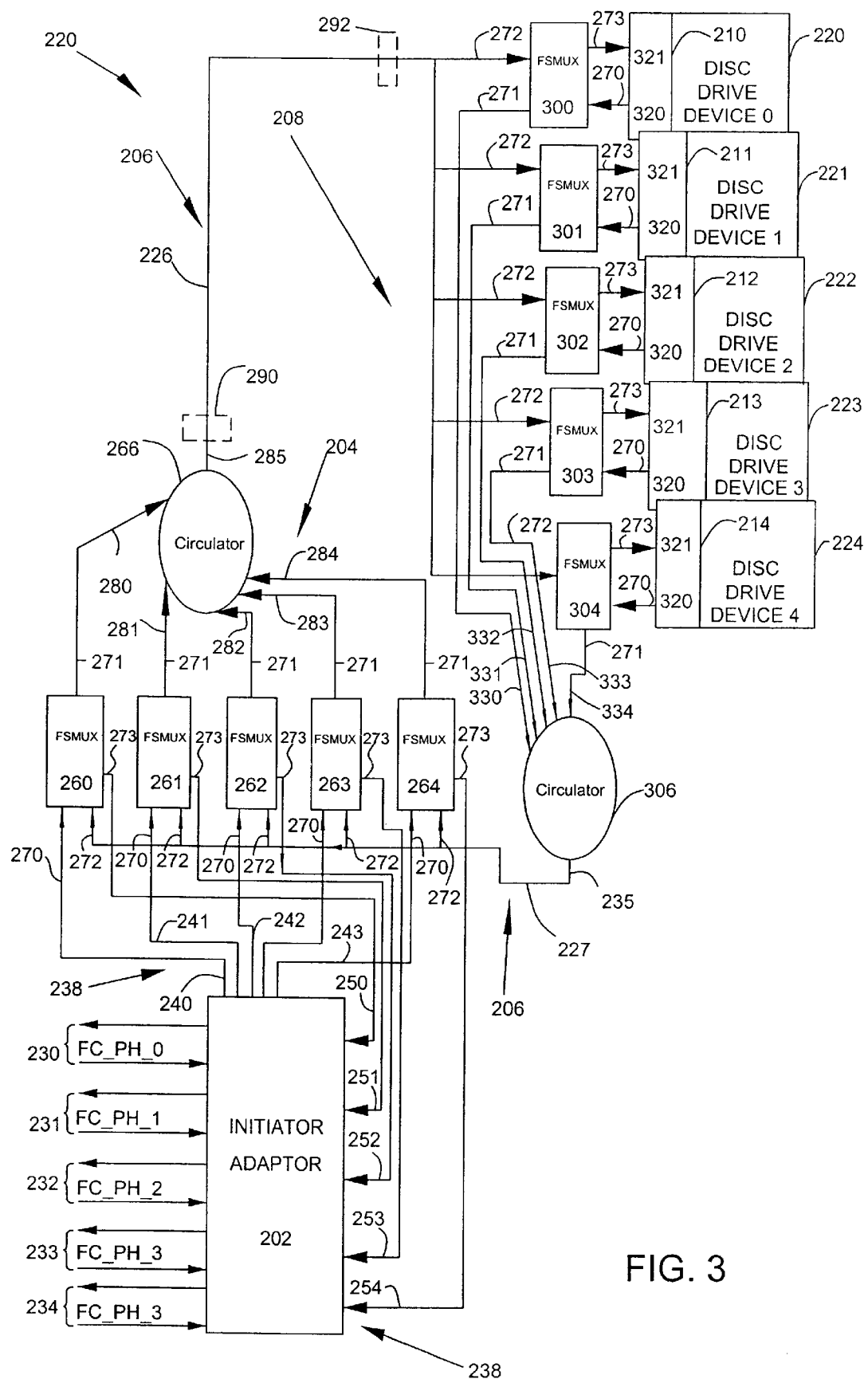
FIG. 3 is a block diagram of a disc drive system according to a preferred embodiment of the present invention.

FIG. 3 is a block diagram of a disc drive system according to the present invention which uses analog communication signal processing techniques to frequency multiplex and demultiplex serial data over a single communication channel. Frequency multiplexing and demultiplexing the data allows for a higher effective data transfer rate with present transceivers. Disc drive system 200 includes initiator adapter 202, frequency selective circuit 204, transmission medium 206, frequency selective circuit 208, disc drive interfaces 210–214 and disc drive devices 220–224. Transmission medium 206 includes first transmission path 226 and second transmission path 227.

Initiator adapter 202 includes a plurality of serial communication ports 230–234 and an interface 238 formed of a plurality of serial transmit ports 240–244 and a plurality of serial receive ports 250–254. Initiator adapter 202 interfaces between serial communication channels 230–234, serial transmit ports 240–244 and serial receive ports 250–254. In one embodiment, initiator adapter 202 includes a Fiber Channel host adapter for transmitting and receiving a plurality of serial Fiber Channel signals FC_PH_0–FC_PH_4 to and from disc drive devices 220–224 over transmission medium 206. Fiber Channel signals FC_PH_0–FC_PH_include digital data that is encoded using 8B/10B encoding rules developed by IBM Corporation, which achieves a neutral alternating current (AC) signal, for example. Serial communication channels 230–234 are typically coupled to one or more disc drive initiator devices (not shown), such as a host system or a plurality of workstations. Serial transmit ports 240–244 and serial receive ports 250–254 can be single-ended or differential.

Initiator adapter 202 can include a variety of circuits, depending upon the particular application in which the present invention is used. For example, initiator adapter can include simple switches between serial communication channels 230–234 and respective serial transmit ports 240–244 and serial receive ports 250–254. In alternative embodiments, initiator adapter can be configured to buffer data, perform demand orientated handshaking functions or can include a complex RAID controller for communicating with an array of disc drive devices (e.g. 220–224).

Frequency selective circuit 204 includes a plurality of frequency selective multiplexer-demultiplexer elements 260–264 and a circulator 266. Each multiplexer-demultiplexer element 260–264 includes a binary transmit data input 270, an analog transmit data output 271, an analog receive data input 272 and a binary receive data output 273. Binary transmit data inputs 270 of elements 260–264 are operatively coupled to serial transmit ports 240–244, respectively. Analog transmit data outputs 271 of elements 260–264 are operatively coupled to inputs 280–284, respectively, of circulator 266. Analog receive data inputs 272 of elements 260–264 are operatively coupled to transmission path 227 of transmission medium 206. Binary receive data outputs 273 of elements 260–264 are operatively coupled to serial receive ports 250–254, respectively. Circulator 266 has an output 285 which is operatively coupled to first transmission path 226 of transmission medium 206.

Elements 260–264 modulate serial transmit signals received from serial transmit ports 240–244 in respective frequency bands and apply the modulator serial transmit signals to circulator 266. Circulator 266 combines the modulated serial transmit signals and applies the combined signals, which are now frequency multiplexed, to first transmission path 226 for transmission to disc drive devices 220–224.

In one example, Fiber Channel signals FC PH_0–FC_PH_4 have data frequencies ranging from 106.25 Mhz to 531.25 Mhz in five multiples. Using a fundamental frequency of 106.25 Mhz (F), the following respective frequency bands are defined for elements 260–264 (from 106.25 Mhz to 1.59375 Ghz to cover a third harmonic):

| | |
|---|---|
| BAND A | 1.700 Ghz to 3.29375 Ghz |
| BAND B | 3.400 Ghz to 4.99375 Ghz |
| BAND C | 5.100 Ghz to 6.69375 Ghz |
| BAND D | 6.800 Ghz to 8.39375 Ghz |
| BAND E | 8.500 Ghz to 10.09375 Ghz |

Bands A–E are spaced to limit inter-modulation distortion, but can be placed closer together if desired.

Transmission medium 206 can include copper cables, printed circuit board traces, optical cables and/or wireless means such as radio frequency or infrared links. With optical cables, optical-to-electrical converters 290 and 292 are positioned at opposite ends of transmission medium 206. Optical-to-electrical converter 290 converts the analog electrical signals at output 285 of circulator 266 to optical signals that are transmitted over transmission medium 206. Optical-to-electrical converter 292 receives the optical signals and converts them to electrical signals at the other end of transmission medium 206.

The transmission signals received by optical-to-electrical converter 292 are applied to frequency selective circuit 208. Frequency selective circuit 208 frequency demultiplexes the transmission signals received from transmission medium 206 and applies the demultiplexed signals to respective disc drive interfaces 210–214. Frequency selective circuit 208 includes multiplexer-demultiplexer elements 300–304 and circulator 306. Multiplexer-demultiplexer elements 300–304 are similar to multiplexer-demultiplexer elements 260–264 and each include a binary transmit data input 270, an analog transmit data output 271, an analog receive data input 272 and a binary receive data output 273. Each disc drive interface 210–214 includes a serial transmit port 320 and a serial receive port 321. The serial transmit ports 320 of disc drive interfaces 210–214 are operatively coupled to binary transmit data inputs 270 of multiplexer-demultiplexer elements 300–304, respectively. The serial receive ports 321 of disc drive interfaces 210–214 are operatively coupled to binary receive data outputs 273 of multiplexer-demultiplexer elements 300–304, respectively. The analog transmit data outputs 271 of multiplexer-demultiplexer elements 300–304 are operatively coupled to inputs 330–334, respectively, of circulator 306. The analog receive data inputs 272 of elements 300–304 are operatively coupled to transmission medium 206. Circulator 306 has an output 335 which is operatively coupled to transmission medium 206.

Multiplexer-demultiplexer elements 300–304 have frequency bands which correspond to the frequency bands of multiplexer-demultiplexer elements 260–264, respectively. Elements 300–304 frequency demultiplex the transmission signal by demodulating the transmission signal in each of the respective frequency bands to recover the serial transmit signals transmitted from serial transmit ports 240–244 of initiator adapter 202. The serial transmit signals are then applied to binary receive data outputs 273 of elements 300–304, which are coupled to serial receive ports 321 of disc drive interfaces 312–316. Each disc drive device 220–224 is coupled to a respective one of the disc drive interfaces 210–214 for receiving the respective serial transmit signal.

In the reverse direction, serial transmit signals provided by disc drive devices 212–216 are applied to serial transmit ports 320 of disc drive interfaces 210–214. Multiplexer-demultiplexer elements 300–304 receive the serial transmit signals on binary transmit data inputs 270 and modulate the serial transmit signals in the respective frequency bands. The modulated serial transmit signals are applied to analog transmit data outputs 271 and received on inputs 330–334 of circulator 306. Circulator 306 combines the modulated serial transmit signals into a single transmission signal which is applied to circulator output 335 and then transmitted over transmission medium 206 to frequency selective circuit 204. Multiplexer-demultiplexer elements 260–264 receive the transmission signal on analog receive data inputs 272 and demodulate the transmission signal in the respective frequency bands to recover the serial transmit signals provided by disc drive devices 220–224. The recovered serial transmit signals are then applied to binary receive data outputs 273 of multiplexer-demultiplexer elements 260–264, which are coupled to serial receive ports 250–254, respectively, of initiator adapter 202.

Figure 4:
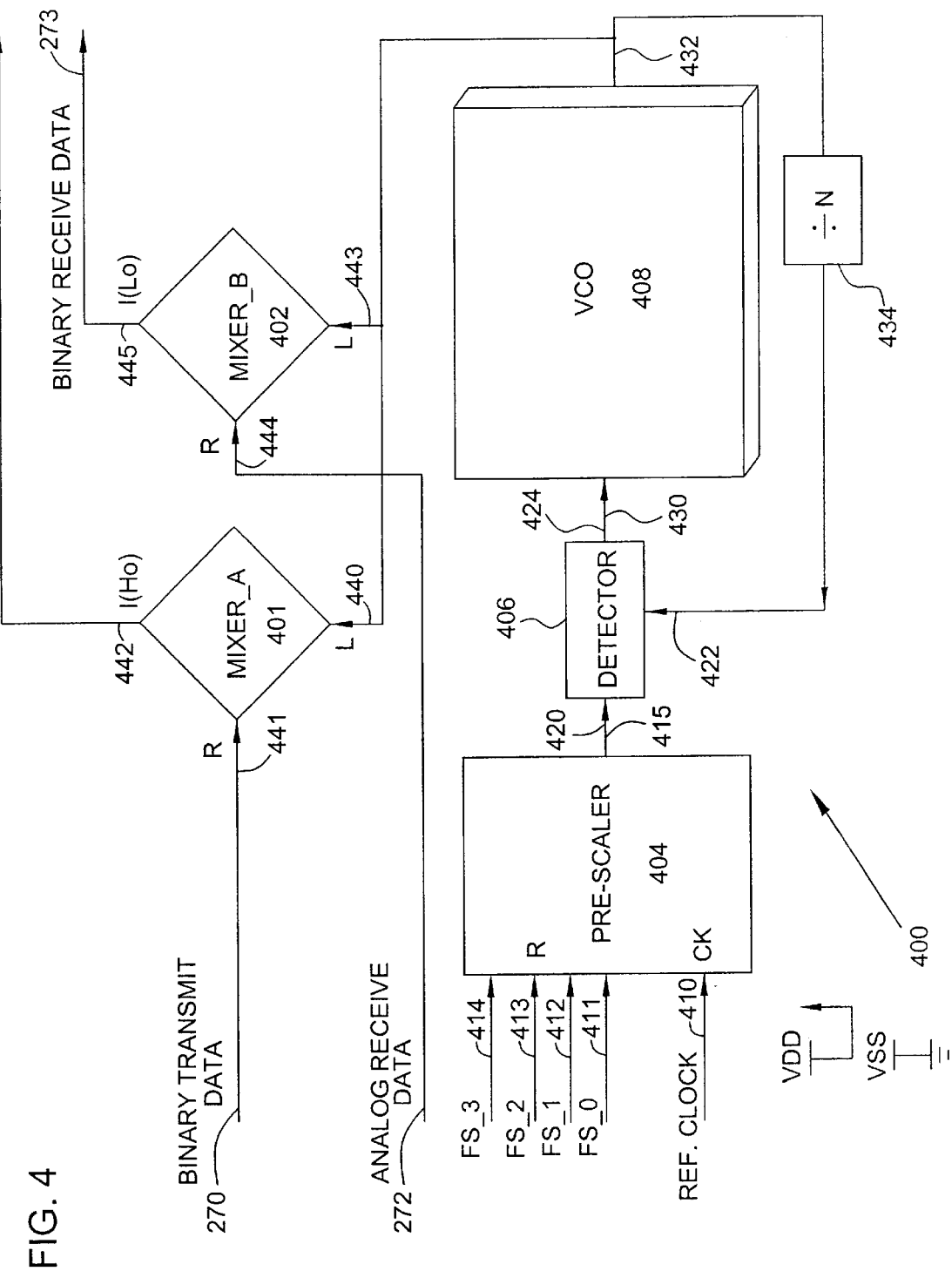
FIG. 4 is a block diagram of a multiplexer-demultiplexer element shown in FIG. 3.

FIG. 4 is a block diagram of one of the multiplexer-demultiplexer elements 260–264 and 300–304. Each multiplexer-demultiplexer element includes a frequency synthesizer 400 and mixers 401 and 402. Frequency synthesizer 400 includes pres-scaler circuit 404, phase/frequency detector 406 and voltage-controlled oscillator (VCO) 408. Pre-scaler circuit 404 includes reference clock input 410, frequency select inputs 411–414, and pre-scaled frequency output 415. Pre-scaler circuit 404 receives a reference clock signal REF. CLOCK having a frequency, such as a fundamental frequency of 106.25 Mhz, on reference clock input 410 and generates a pre-scaled frequency signal on pre-scaled frequency output 415 as a function of a pre-scaling factor R. The pre-scaling factor R is determined by binary frequency select signals FS_0–FS_3 received on frequency select inputs 411–414. The pre-scaling factor R is different for each multiplexer-demultiplexer element 260–264, and multiplexer elements 300–304 have the same pre-scaling factors as multiplexer-demultiplexer elements 260–264, respectively.

Binary frequency select signals FS_0–FS_3 can be generated by hard-wiring inputs 411–414 in a selected combination to power and ground supply terminals VDD and VSS. In an alternative embodiment, frequency select inputs 411–414 are coupled to a programmable logic circuit (not shown) which programs frequency select signals FS_0–FS_3.

Phase/frequency detector 406 includes a reference input 420, a feedback input 422 and a control voltage output 424. Reference input 420 is coupled to pre-scaled frequency output 415. Feedback input 422 is coupled to VCO output 432. Control voltage output 424 is coupled to control voltage input 430. VCO 408 generates a local oscillator signal on VCO output 432 as a function of the voltage applied to control voltage input 430. The local oscillator signal is applied to feedback input 422 of phase/frequency detector 402 through a frequency divider 434. Frequency divider 434 divides the frequency of the local oscillator signal by a factor N, such as 10. Phase-frequency detector 406 adjusts the voltage on control voltage output 424 as a function of a difference in the phase and frequency between the feedback signal applied to feedback input 422 and the pre-scaled frequency signal applied to reference input 420. Phase/frequency detector 406 can include a phase/frequency comparator, a charge pump and loop filter, for example.

Pre-scaler circuit 404, phase-frequency detector 406 and VCO 408 set the center frequency for the selected frequency band of each multiplexer-demultiplexer element at VCO output 432 according to the relation in Equation 1:

$$f_{VCO} = \frac{f_{CK} \times N}{R} \qquad \text{(Eq. 1)}$$

where $f_{VCO}$ is the local oscillator frequency at VCO output 432, $f_{CK}$ is the frequency of the reference clock at reference clock input 410, N is the division factor of divider circuit 434 and R is the prescaling factor determined by frequency select signals FS_0–FS_3.

The local oscillator signal generated at VCO output 432 is applied to mixers 401 and 402 for determining the modulation and demodulation frequency bands, respectively, of the mixers. Mixer 401 has a local oscillator port (L) 440, a receive port (R) 441 and an intermodulation product port (I) 442. Local oscillator port 440 is coupled to VCO output 432, receive port 441 is coupled to binary transmit data input 270 and intermodulation product port 442 is coupled to analog transmit data output 271.

Mixer 402 has a local oscillator port (L) 443, a receive port (R) 444 and an intermodulation product port (I) 445. Local oscillator port 443 is coupled to VCO output 432, receive port 444 is coupled to analog receive data input 272 and intermodulation product port 445 is coupled to binary receive data output 273. In one embodiment, intermodulation product port 442 corresponds to a high output (HO) side band of mixer 401, and intermodulation product port 445 corresponds to a low output (LO) side band of mixer 402. Mixer 401 forms a modulator which frequency modulates the serial transmit signals received on binary transmit data input 270 onto the local oscillator signal (i.e. the "carrier" signal) generated on VCO output 432. The modulated serial transmit signal is applied to analog transmit data output 271. Mixer 402 forms a demodulator which demodulates signals received on analog receive data input 272 from the carrier signal within the frequency band determined the local oscillator signal generated on VCO output 432. The demodulated signals are applied to binary receive data output 273.

Figure 5:
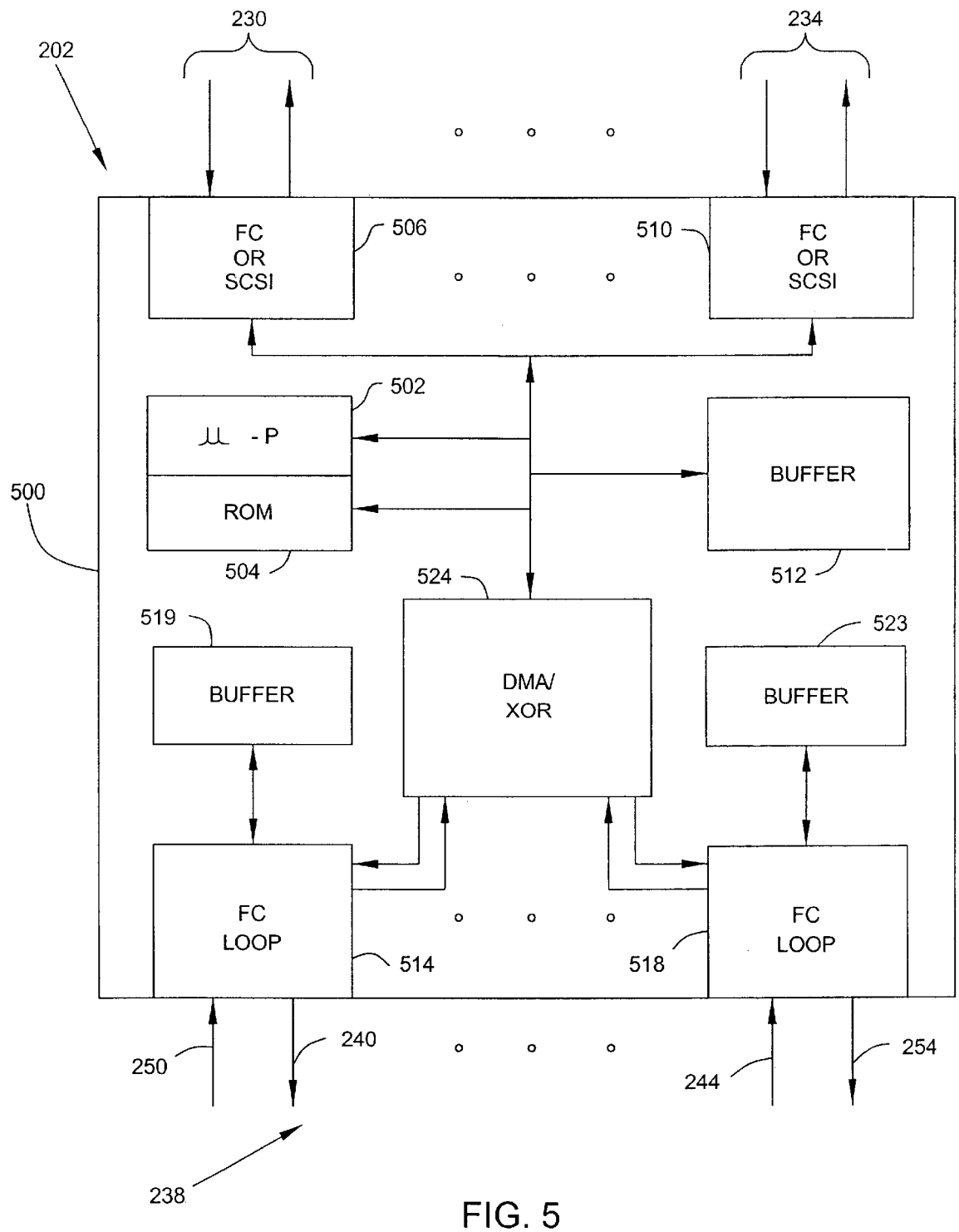
FIG. 5 is a block diagram of an initiator adapter shown in FIG. 3.

FIG. 5 is a block diagram of initiator adapter 202 shown in FIG. 3. In this embodiment, initiator adapter 202 includes a Fiber Channel (FC) host adapter 500. FC host adapter 500 includes microprocessor 502 with associated memory 504 which stores software for performing a RAID controller function. Memory 504 can include a Read-Only Memory (ROM), Random-Access Memory (RAM) or Erasable Programmable Read-Only Memory (EPROM), for example, or any combination thereof. FC host adapter 500 includes Fiber Channel or SCSI interface circuits 506–510 (507–509 not shown) for interfacing with communication channels 230–234. FC host adapter 500 also has an associated cache or buffer memory 512. The interface between FC host adapter 500 and serial transmit and receive ports 240–244 and 250–254 is accomplished through Fiber Channel loop interface circuits 514–518 (515–517 not shown). Each Fiber Channel loop interface circuit has a dedicated buffer 519–523 (520–522 not shown). Finally, FC host adapter 500 includes a direct memory access (DMA) controller and exclusive-OR (XOR) logic 524. The elements within FC host adapter 500 include well known logic and can be modified to suit a particular application.

Microprocessor 502 can be configured to implement any RAID control function. Several types of RAID functions or RAID levels are known. First level RAID is characterized by providing mirrored discs. In first level RAID, all the discs in the array are duplicated. Thus, should one disc or disc drive fail, the information is not lost since that exact information is mirrored on another disc drive. Second level RAID includes a Hamming Code for error correction. In second level RAID data is bit-interleaved across the discs of a group and check discs are added to detect and correct a single error.

Third level RAID is characterized by having a single check disc per group of discs. In third level RAID, the extra check discs used in second level RAID for storing error correction code information are eliminated. Rather, as the data is being stored to the disc array, Error Correction Code (ECC) information is appended to the data. Also, a single disc or disc drive is used to store redundant data corresponding to the data stored in the array. When reading information from the array, the ECC information is used to determine whether an error has occurred, and which disc contains the error. Then, the information on the failed disc is reconstructed by calculating the parity of the remaining good discs and comparing bit-by-bit to the parity information that was calculated for the original group of data and that was stored on the redundant or parity disc drive.

Fourth level RAID is characterized by being arranged so that it provides for independent reads and writes. Each data sector stored in the array is kept as an individual unit on a single disc. The information stored in the array is interleaved among data discs on a sector level rather than on a bit level. In fifth level RAID, both the data to be stored in the array as well as the parity or redundant data, is spread over all discs in a group. Thus, there is no single check disc. Fifth level RAID distributes the data and check information per sector across all the discs, including the check disc. Therefore, fifth level RAID can support multiple individual write operations per group.

A more detailed description of RAID systems is provided in Anderson U.S. Pat. No. 5,617,425, issued Apr. 1, 1997 and entitled "DISC ARRAY HAVING SUPPORTING CONTROLLER INTERFACE," which is assigned to Seagate Technology, Inc. and in Patterson, Gibson and Katz, "A CASE FOR REDUNDANT ARRAYS OF INEXPENSIVE DISCS (RAID)," Report No. UCB/CSD 87/391, Computer Science Division (EECS), University of California, Berkely Calif. 94720 (Dec. 1987).

Figure 6:
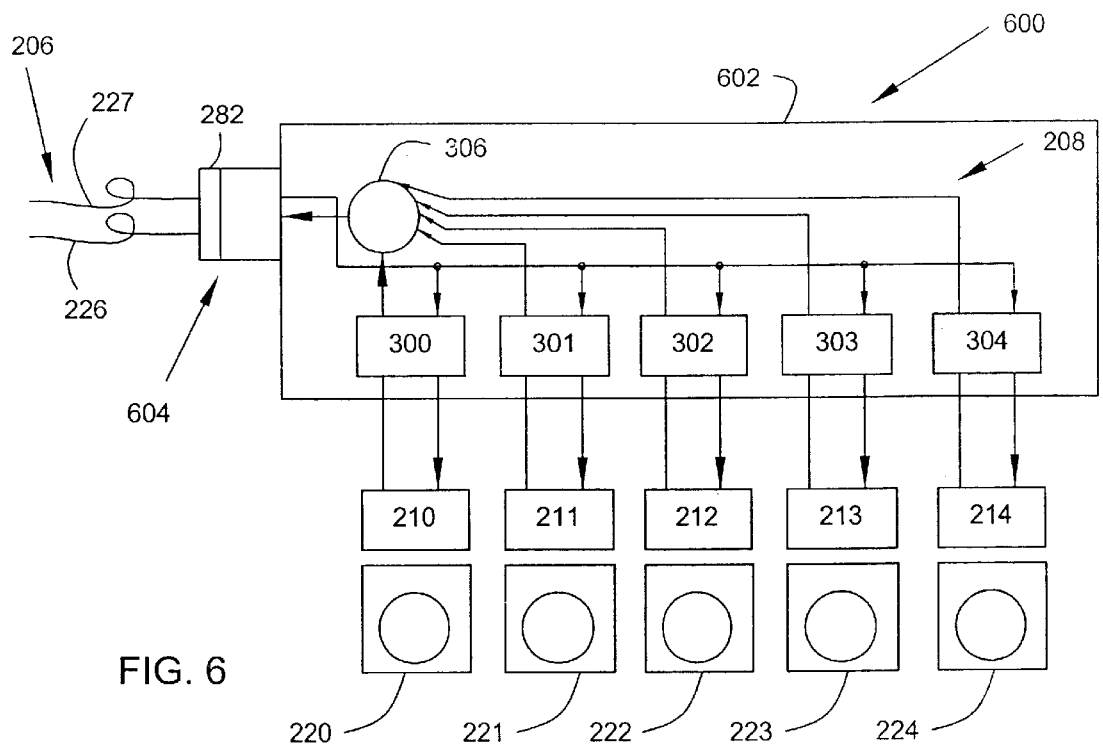
FIG. 6 is a block diagram of a disc drive system backplane according to one embodiment of the present invention.

FIG. 6 is a block diagram of a disc drive system backplane 600 which incorporates frequency selective circuit 208, according to one embodiment of the present invention. In this embodiment, all elements of frequency selective circuit 208, including multiplexer-demultiplexer elements 300–304 and circulator 306, are mounted on a single circuit board 602. Multiplexer-demultiplexer elements 300–304 are operatively coupled to disc drive interfaces 210–214, respectively. Disc drive interfaces 210–214 may include sockets for providing an easy connection to disc drive devices 220–224. In a RAID application, should any disc drive device fail, that device may be easily pulled and replaced. A media interface adapter (MIA) 604 is attached to circuit board 602 for providing a connection between transmission medium 206 and the elements mounted on circuit board 602. In embodiments in which transmission medium 206 includes fiber optic cables, media interface adapter 604 may also include optical-to-electrical converter 292.

In an alternative embodiment, each multiplexer-demultiplexer element 300–304 is mounted on its own circuit board which is operatively coupled to a respective one of the disc drive interfaces 210–214. Communication between the circuit boards can be implemented with copper cables, fiber optic cables or wireless means such as infrared or RF technology, for example. Other backplane configurations can also be used. The present invention allows a new class of Fiber Channel (FC) and Fiber Channel Arbitrated Loop (FC-AL) designs to become possible. For very large, resilient systems, the present invention allows for the possibility of a "wireless" backplane that may offer economic gains, ease of configuration and maintenance, and performance gains.

Figure 7:
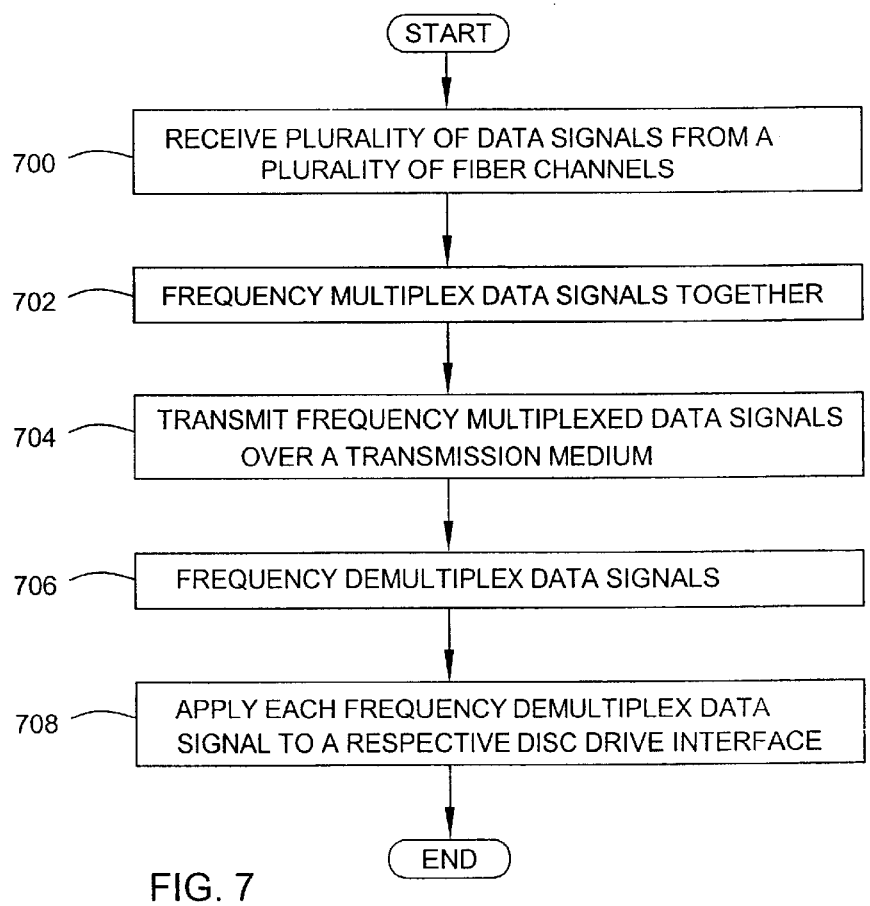
FIG. 7 is flow chart illustrating a method of transmitting of plurality of data signals from an initiator interface to a plurality of disc drive interfaces in accordance with the preferred embodiment of the present invention.

FIG. 7 is flow chart illustrating a method of transmitting of plurality of data signals from an initiator interface to a plurality of disc drive interfaces in accordance with the present invention. At step 700, the initiator interface receives data signals from a plurality of fiber channels. At step 702, the plurality of data signals are frequency multiplexed together by modulating the data signals in respective, unique frequency bands and then combining the modulated data signals. The combined, modulated data signals are then transmitted over a common transmission medium, at step 704. At step 706, the data signals are frequency demultiplexed by demodulating the data signals in the respective frequency bands. Each frequency demultiplexed data signal is then applied to a respective disc drive interface, at step 708.

An advantage of the present invention is that it provides for higher performance serial interfaces in disc drive communication channels. For example, a RAID controller can maintain a four to five-gigabit throughput by frequency multiplexing five, one-gigabit data paths over a single transmission path. Frequency multiplexing disc drive communication data allows improved performance with presently available integrated transceivers and offers an economical, cost-effective implementation for a disc drive system.

One aspect of the present invention relates to a data storage communication channel including a transmission medium 206, an initiator interface 238 and a frequency selective multiplexer 204. Transmission medium 206 includes a first transmission path 226. Initiator interface 238 includes first and second serial transmit ports (e.g. 240 and 242) for transmitting first and second serial transmit signals, respectively. Frequency selective multiplexer 204 includes first and second modulators (e.g. 260, 261, 400 and 401) which are operatively coupled to the first and second serial transmit ports, respectively. The first and second modulators modulate the first and second serial transmit signals in first and second frequency bands, respectively, wherein the first frequency band is separate from the second frequency band. Circulator 266 is operatively coupled between the first and second modulators (e.g. 260 and 261) and the first transmission path 226. Circulator 266 combines the first and second modulated serial transmit signals into a transmission signal and applies the transmission signal to the first transmission path 226.

Another aspect of the present invention relates to a data storage communication channel including a transmission medium 206, a frequency selective demultiplexer 208 and first and second data storage interfaces (e.g. 210 and 211). Transmission medium 206 includes a transmission path 226 for carrying a transmission signal having first and second serial, digital transmit signals modulated in first and second frequency bands, respectively. Frequency selective demultiplexer 208 includes first and second demodulators (e.g. 300, 301, 400 and 402) which are operatively coupled to the first transmission path 226 to receive the transmission signal. The first and second demodulators demodulate the first and second serial, digital transmit signals from the transmission signal in the first and second frequency bands, respectively. First and second data storage interfaces (e.g. 210 and 211) are operatively coupled to the first and second demodulators, respectively, to receive the demodulated first and second serial transmit signals.

Another aspect of the present invention relates to a data storage system backplane (e.g 600) for coupling to a communication channel. The backplane includes a transmission media interface 604, first and second data storage interfaces (e.g. 210 and 211), a frequency sective multiplexer 208 and a frequency selective demultiplexer 208.

Another aspect of the present invention relates to a method of transmitting a plurality of data signals from a data storage initiator interface 238 to a plurality of data storage interfaces 210–214 which are operatively coupled to a data storage system backplane (e.g. 600). The method includes the steps of: (a) frequency multiplexing the plurality of data signals together, wherein each of the plurality of data signals is modulated in a respective frequency band and wherein the respective frequency bands are separate from one another; (b) transmitting the frequency multiplexed plurality of data signals to the data storage system backplane 600 through a serial transmission medium 206; (c) frequency demultiplexing the frequency multiplexed plurality of data signals received at the data storage system backplane, wherein each of the plurality of data signals is demodulated from the respective frequency band; and (d) applying each of the frequency demultiplexed plurality of data signals to a respective one of the plurality of data storage interfaces 210–214.

Yet another aspect of the present invention relates to a data storage communications channel 200 including a plurality of data storage interfaces 210–214 and communication means for transmitting data to and receiving data from the plurality of data storage interfaces 210–214 by frequency multiplexing the data over a transmission medium.

It is understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular configuration of the data storage subsystem while maintaining substantially the same functionality without departing from the scope and spirit of the present invention. In addition, although the preferred embodiment described herein is directed to a disc array for implementing a RAID function over a Fiber Channel, it will be appreciated by those skilled in the art that the teachings of the present invention can be applied to other systems and data communication protocols. In addition, to frequency multiplexing data signals over a common transmission line, additional data signals may also be time multiplexed over the transmission line to allow communication with even a greater number of disc drives. Also, the present invention can be used with a variety of data storage devices, such as a disc drive or a tape drive.

What is claimed is:

1. A data storage communication channel comprising:
   (a) a transmission medium comprising first and second transmission paths, wherein the first transmission path is coupled between a first circulator and a first and second demodulator;
   (b) an initiator interface comprising first and second serial transmit ports for transmitting first and second serial transmit signals, respectively, and first and
   second serial receive ports for receiving first and second serial transmit signals, respectively;
   (c) a first frequency selective multiplexer comprising:
      (1) first and second modulators which are operatively coupled to the first and second serial transmit ports, respectively, and modulate the first and second serial transmit signals in first and second frequency bands, respectively, wherein the first frequency band is different than the second frequency band; and
      (2) a first circulator which is operatively coupled between the first and second modulators and the transmission medium and which combines the first and second modulated serial transmit signals into a first transmission signal and applies the first transmission signal to the transmission medium; and
   (d) a first frequency selective demultiplexer comprising:
      (1) first and second demodulators which are operatively Coupled to the transmission medium to receive the first transmission signal and which demodulate the first and second serial transmit signals from the first transmission signal in the first and second frequency bands, respectively; and
      (2) first and second data storage interfaces which are operatively coupled to the first and second demodulators, respectively, to receive the demodulated first and second serial transmit signals, the first data storage interface further comprising a third receive port which is operatively coupled to the first demodulator and comprises a third port for transmitting a third serial transmit signal;

(e) a second frequency selective multiplexer comprising:
  (1) third and fourth modulators which are operatively coupled to the third and fourth serial transmit ports, respectively, and modulate the third and fourth serial transmit signals in first and second frequency bands, respectively, wherein the first frequency band is different than the second frequency band; and
  (2) a second circulator which is operatively coupled between the third and fourth modulators and the second transmission path and which combines the third and fourth modulated serial transmit signals into a second transmission signal and applies the second transmission signal to the second transmission path; and
(f) a second frequency selective demultiplexer comprising:
  (1) third and fourth demodulators which are operatively coupled to the second transmission path to receive the second transmission signal and which demodulate the third and fourth serial transmit signals from the second transmission signal in the first and second frequency bands, respectively.

2. The data storage communication channel of claim 1, further comprising a disc drive array operatively coupled to each of the first and second data storage interfaces.

3. The data storage communication channel of claim 1, further comprising at least one nonvolatile data storage element operatively coupled to each of the first and second data storage interfaces.

4. A data storage system backplane comprising:
a transmission medium interface having a channel transmit port and a channel receive port;
first and second data storage interfaces, each data storage interface comprising a serial transmit port and a serial receive port;
a frequency selective multiplexer operatively coupled between the channel transmit port and the serial transmit ports of the first and second data storage interfaces; wherein the frequency selective multiplexer comprises:
  a first modulator, operatively coupled to the serial transmit port of the first data storage interface and having a first modulation frequency band;
  a second modulator, operatively coupled to the serial transmit port of the second data storage interface and having a second modulation frequency band, which is outside the first modulation frequency band; and
  a circulator operatively coupled between the channel transmit port, the first modulator and the second modulator; and
a frequency selective demultiplexer operatively coupled between the channel receive port and the serial receive ports of the first and second data storage interfaces wherein the frequency selective demultiplexer comprises:
  a first demodulator, operatively coupled between the channel receive port and the serial receive port of the first data storage interface and having a first demodulation frequency band which corresponds to the first modulation frequency band; and
  a second demodulator, operatively coupled between the channel receive port and the serial receive port of the second data storage interface and having a second demodulation frequency band which corresponds to the second modulation frequency band.

5. The data storage system backplane of claim 4 wherein:
the first modulator comprises:
  a first mixer having a mixer receive port, a local oscillator port, and an intermodulation product port, wherein the mixer receive port is operatively coupled to the serial transmit port of the first data storage interface and the intermodulation product port is operatively coupled to the circulator; and
  a first frequency synthesizer comprising
    a pre-scaler input, a reference clock input and a local oscillator output which is operatively coupled to the local oscillator port of the first mixer; and
the first demodulator comprises:
  a second mixer having a mixer receive port which is operatively coupled to the channel receive port, a local oscillator port which is operatively coupled to the local oscillator output of the first frequency synthesizer, and an intermodulation product port which is operatively coupled to the serial receive port of the first data storage interface.

6. The data storage system backplane of claim 5 and further comprising:
a power supply terminal and a ground supply terminal; and
wherein the pre-scaler input comprises a plurality of frequency select input terminals which are operatively coupled to the power and ground supply terminals in a selected combination that corresponds to a pre-scaling factor; and
wherein the first frequency synthesizer comprises means for generating the local oscillator output as a function of the pre-scaling factor such that the local oscillator output defines a center frequency of the first modulation frequency band and the first demodulation frequency band.

7. The data storage system backplane of claim 5 wherein:
the second modulator comprises:
  a third mixer having a mixer receive port, a local oscillator port, and an intermodulation product port, wherein the mixer receive port of the third mixer is operatively coupled to the serial transmit port of the second data storage interface and the intermodulation product port is operatively coupled to the circulator; and
a second frequency synthesizer comprising a pre-scaler input, a reference clock input and a local oscillator output which is operatively coupled to the local oscillator port of the third mixer; and
the second demodulator comprises:
  a fourth mixer having a mixer receive port which is operatively coupled to the channel receive port, a local oscillator port which is operatively coupled to the local oscillator output of the second frequency synthesizer, and an intermodulation product port which is operatively coupled to the serial receive port of the second data storage interface.

8. The data storage system backplane of claim 4 and further comprising first and second circuit boards, wherein the first modulator and the first demodulator are mounted to the first circuit board and wherein the second modulator and the second demodulator are mounted to the second circuit board.

9. The data storage system backplane of claim 4 further comprising a circuit board, wherein the media interface, the frequency selective multiplexer and the frequency selective demultiplexer are mounted to the circuit board.

* * * * *